Dec. 31, 1935.   G. REID   2,026,400
STOKER MECHANISM
Filed Feb. 24, 1932   3 Sheets-Sheet 3
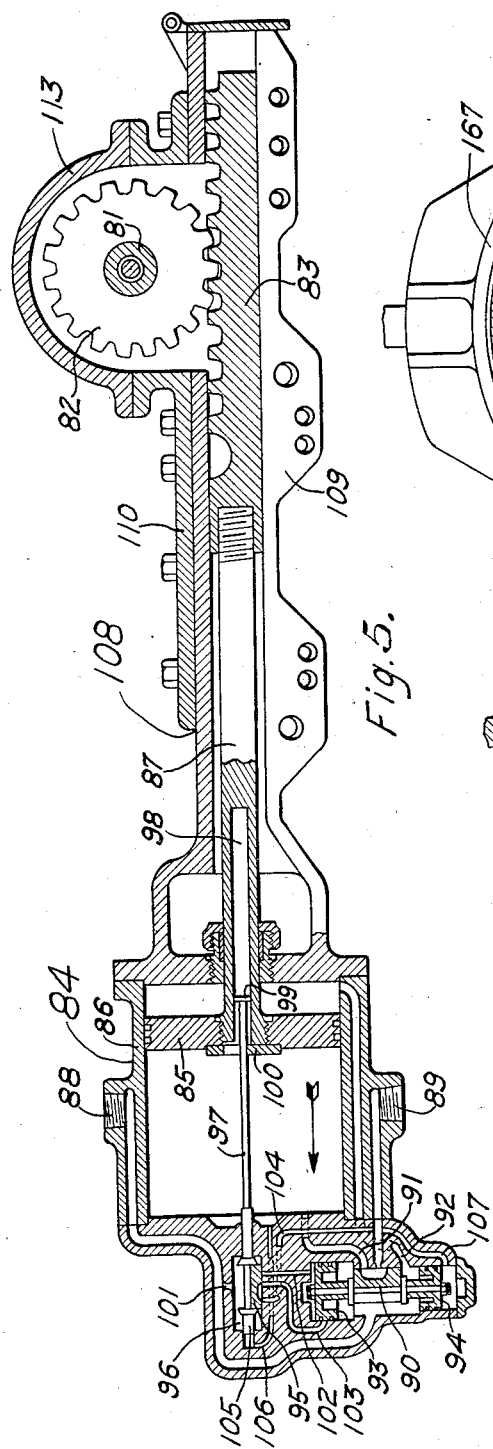
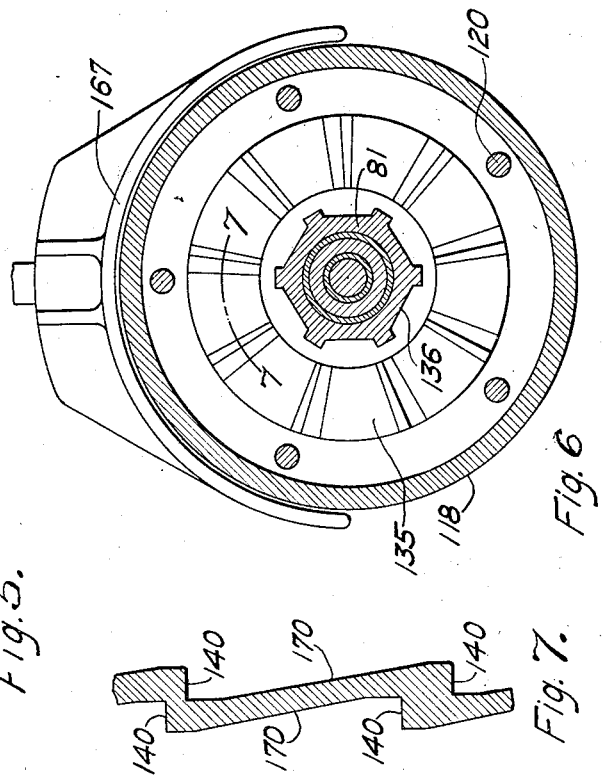
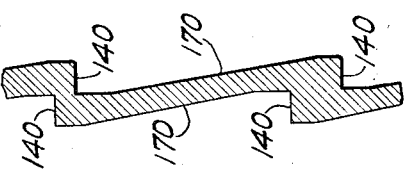
GRANT REID
INVENTOR.
BY *E. Archer Turner*
ATTORNEY Patented Dec. 31, 1935

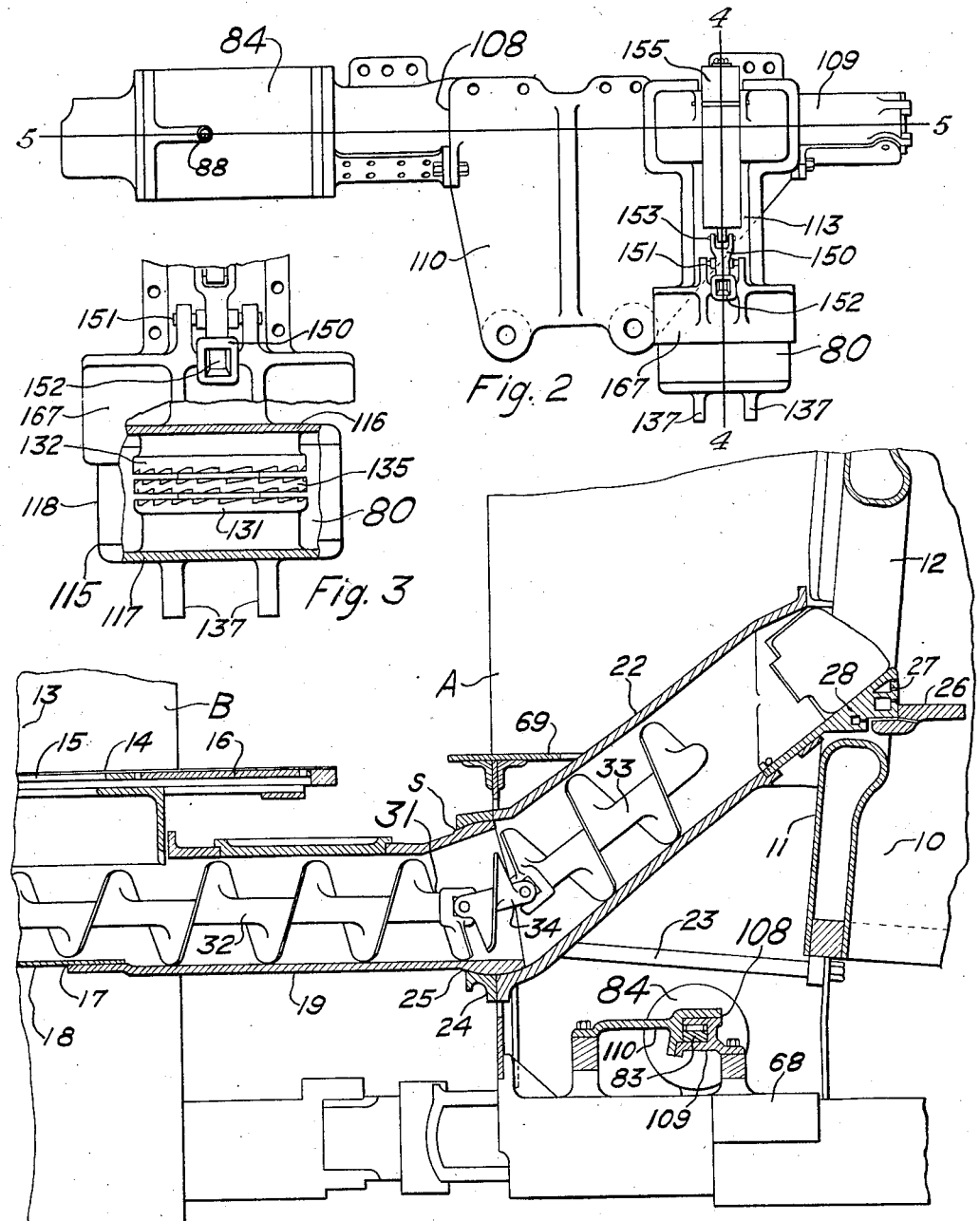

2,026,400

UNITED STATES PATENT OFFICE 2,026,400

STOKER MECHANISM

Grant Reid, Baltimore, Md., assignor to The Standard Stoker Company, Incorporated, a corporation of Delaware Application February 24, 1932, Serial No. 594,817

9 Claims. (Cl. 74—130)

This invention relates generally to operating mechanism for a screw conveying system, and more particularly to operating mechanism comprising a reciprocating pressure fluid engine and an associated clutch mechanism for a screw conveying system of a locomotive stoker.

Mechanical stokers are liable to become clogged and stopped either by congestion or by the pressure of extraneous matter, such as scraps of metal, being accidentally intermixed with the fuel. When this occurs it becomes necessary to temporarily reverse the direction of the screw conveying means, and to this end the clutch must be released. The stalling will occur on the power stroke of the engine, and as the clutch mechanism is then under pressure its manual disengagement is difficult or impossible, and it has been necessary to provide means for relieving this pressure. It is therefore, the principal object of this invention to provide an arrangement of a reciprocating engine and clutch mechanism that will permit easy manual reversal of the screw conveying means, in the event of the stoker being stopped by clogging, during the power stroke of the engine piston and while pressure is applied thereto.

It is a further object of the invention to provide improved and novel clutch mechanism that will obviate the necessity of providing added means for relieving the pressure on the engine piston, in order that the clutch connecting the engine with the screw conveying means may be released.

Still another object of the invention is the provision of a clutch and means for controlling the clutch that is simple in design, compact, composed of relatively few parts, efficient in operation and that may be readily disassembled for purposes of repair and replacement of parts.

Other and further objects of the invention contemplate the particular features of construction, combinations of elements and arrangement of parts hereinafter more fully described and illustrated in the accompanying drawings, in which Fig. 1 is a vertical longitudinal central sectional view of a portion of a locomotive and its tender, illustrating parts of a stoker, which are also in section, mounted therein;

Fig. 2 is a plan view of the driving unit for the fuel conveyor in the stoker conduit;

Fig. 3 is an enlarged plan view of the clutch and a clutch control lever with part of the clutch casing broken away to show the interior;

Fig. 5 is an enlarged vertical sectional view taken on line 5—5 of Fig. 2 showing the single motor and part of the power transmitting mechanism connecting the motor with the fuel conveyor in the stoker conduit;

Fig. 6 is a vertical sectional view taken on line 6—6 of Fig. 4;

Fig. 7 is an enlarged sectional view taken on line 7—7 of Fig. 6.

Figure 4:
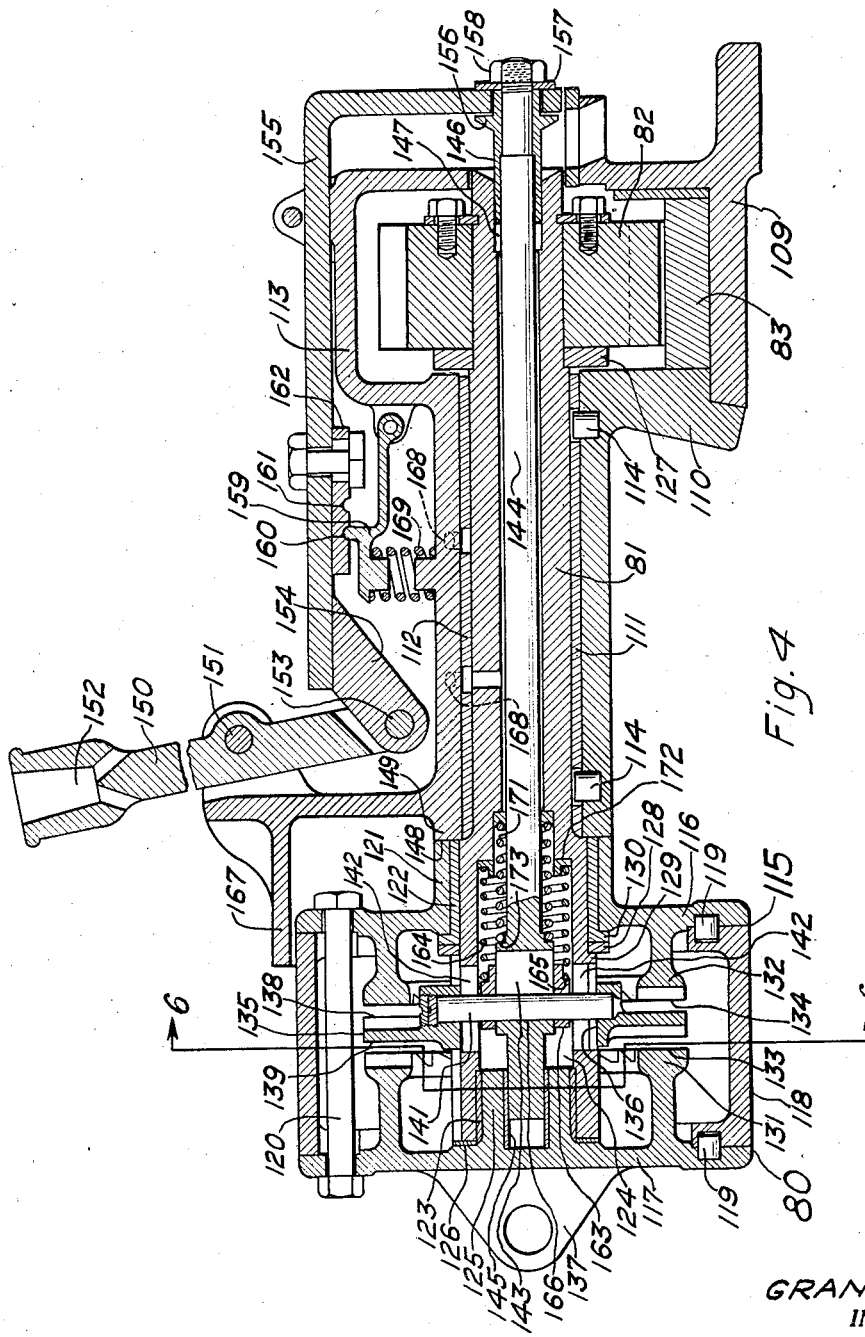
Fig. 4 is an enlarged vertical sectional view taken on line 4—4 of Fig. 2 illustrating the clutch mechanism and clutch control means in detail.

In the drawings, the locomotive is indicated generally by the letter A and is provided with the firebox 10, having a backhead 11 with a firing opening 12 therethrough. The tender is designated generally by the letter B and includes a fuel bin 13 and a deck 14 provided with a longitudinal central opening 15. Slide plates 16 are mounted in the opening 15 and may be moved from covering position to permit gravity feeding of the fuel.

Mounted on the locomotive and tender is a stoker, designated by the letter s, a preferred embodiment of which is illustrated in the drawings and hereinafter described, but it will be obvious as the description proceeds that the invention is equally adaptable to stokers of various types and designs.

The stoker s includes a transfer conduit 17, which comprises the trough portion 18 and the tubular extension 19 leading forwardly from the trough portion 18.

A riser conduit 22 is rigidly attached to the backhead of the locomotive by suitable means, such as the tie bars 23, and communicates at its forward end with the firing opening 12. The conduit 22 extends rearwardly and downwardly, terminating beneath the cab deck 69 in a spherical split flange 24 arranged to receive the ball member 25 of the tubular extension 19 thereby affording universal movement between the transfer conduit 17 and the riser conduit 22.

The riser conduit 22 discharges upon a distributor plate 26, over which fuel is projected and distributed over the fire in the firebox by means of a pressure fluid blast issuing from the jet nozzles 27 in the distributor head 28.

A suitable sectional conveyor screw 31 comprising the sections 32 and 33 is rotatably mounted in the conduit system comprising the transfer conduit 17 and riser conduit 22, the sections being universally connected as by a short screw section 34. The sectional conveyor screw 31 is operated from its rear end through suitable gearing (not shown) and shafting (not shown) connects the gearing with driving mechanism comprising a clutch designated as a whole by numeral 80, a shaft 81, a gear 82 and a rack 83 by a pressure fluid operated motor, represented as a unit by numeral 84, having a single reciprocating piston 85 therein. This driving mechanism is mounted rigidly as a unit separate from the stoker conduit upon the locomotive frame 68.

The motor, best illustrated in Fig. 5, comprises a cylinder 86 within which reciprocates the piston 85 provided with a rod 87. Steam is delivered to the motor at 88, and exhausted at 89. The distributing valve 90 is of D form, and alternately connects ports 91 and 92 with the opposite ends of the cylinder and with the exhaust port 89. This valve is shifted by means of a pair of differential pistons 93, 94, fixed upon its stem and reciprocating in suitable cylinders, steam entering at the port 88 being at all times effective upon the adjacent faces of the two pistons and normally holding the valve 90 in the position shown in Fig. 5, representing the power stroke of the motor.

A controlling valve 95 of D form is mounted in a cylindrical valve chamber 96 formed in the head of the cylinder 86 and in axial alinement with the cylinder. The valve 95 is provided with a stem 97 extending into the cylinder 86 and loosely fitting within an axial aperture 98 in the piston rod 87 and being provided at its inner end with a stud or crosshead 99. As the piston 85 completes its power stroke, moving in the direction indicated by the arrow in Fig. 5, the stem 97 is met by the bottom of the aperture 98 and the valve 95 is thereby shifted to the left. Upon the completion of the return stroke of the piston 85, the stud or cross head 99 is engaged by a detent mounted upon a face of the piston and shown as taking the form of an apertured plate 100, and the valve 95 is shifted to the position of Fig. 5.

A port 101 connects the steam passage leading from the port 88 to the valve chamber 96, and a steam passage 102 leads from this chamber to the end of the cylinder within which the piston 93 reciprocates. An exhaust passage 103 leads from this cylinder to the chamber 96 and is controlled by the valve 95, the cavity of which connects it at suitable times with an exhaust passage 104 leading to the main exhaust passage of the motor. The valve 95 is provided with a projecting stem 105, snugly fitting and reciprocating in a pocket in the casing within which this valve is housed, and a duct 106 connects this pocket with the cylinder 86.

With the parts in the position shown in Fig. 5, the passage 102 is closed by the valve 95, and the exhaust passage 103 is covered by the rim of the piston 93. The passage 91 being connected with the exhaust port 89, pressure in the pocket which receives the stem 105 is relieved. Upon the shifting of the valve 95 to the left, pressure is applied to the outer face of the piston 93, and preponderates over the constant pressure upon the inner face thereof because of the counterbalancing action upon the inner face of the piston 94, forcing the valve 90 downwardly and thereby reversing the direction of the piston 85. A relief passage 107 leads from the rearward end of the cylinder, within which the piston 94 reciprocates, to the passage leading to the exhaust port 89.

The piston 87 is rigidly connected to the rack 83 which reciprocates transversely of the locomotive within an enclosed casing 108 formed by the rack housing 109 and rack housing cover 110. The gear 82 meshes with the rack 83 and is fixed to the forward end of the shaft 81 which is mounted longitudinally of the locomotive, whereby reciprocatory motion of the rack 83 causes oscillatory movement of the shaft 81. The shaft 81 is vertically supported by a bearing split horizontally to provide a lower half 111 and an upper half 112. The lower half bearing 111 is mounted in the rack housing cover 110 and the upper half 112 in a cover 113. The cover 113 is secured to the rack housing cover 110 and forms a part of the chamber in which the gear 82 is mounted. Keys 114 prevent rotation of the bearing with the shaft 81.

A clutch casing 115 is mounted for rotation in opposite directions or "floatably" mounted on the rear end of the shaft 81. A plurality of lugs 137 on the rear end of the clutch casing form one jaw of a universal joint of the shafting (not shown) connecting the clutch casing and the stoker driving unit. The clutch casing 115 is composed of front and rear end plates 116 and 117, respectively, and a cylindrical body portion 118. Proper alinement of the end plates and body portion is assured by means of dowels 119, and the end plates and body portion are rigidly secured together by means of a plurality of spaced through bolts 120. The front end plate 116 is provided with a hub 121, and a bushing 122, pressed in the hub, rides on the shaft 81. A second bushing 123, pressed in an enlarged bore 124 in the shaft 81, rides on a boss 125 which projects into the clutch casing from the rear end plate 117. By this construction the clutch casing is carried by the shaft 81. The end 148 of the hub 121 butts against a boss 149 on the rack housing cover and the cover 113 to prevent forward movement of the clutch casing on the shaft 81. Thrust washers 126 and 127 prevent rearward movement of the shaft 81, and thrust washer 128 inserted between the shoulder 129 on shaft 81 and a circumferential flange 130 on the bushing 122, also prevents forward movement of the shaft 81 and rearward movement of the clutch casing.

A disk 131 is integral with the rear end plate 117 and mounted on the inside surface thereof. A similar disk 132 is integral with the front end plate 116 and mounted on the inside surface thereof. The disks 131 and 132 or clutch elements are shown and described as being integral with the ends of the clutch casing, but they may be separate therefrom and fixed thereto in any desirable manner. The adjacent faces 133 and 134, respectively, of the disks 131 and 132 are spaced a fixed distance from each other and each of the adjacent faces are provided with a series of equally spaced radial projections or teeth, the teeth on one face being disposed for engagement in a direction opposite to that of the teeth on the other face. A third disk member or plate 135 is carried by the shaft 81, rotates therewith and is arranged to slide longitudinally thereof. The perimeter of the shaft 81 in transverse section, rearward of the shoulder 129, is hexagonal in shape (Fig. 6), and an opening 136 through the disk 135 corresponds to the shape of the perimeter of the shaft 81, whereby the said disk will rotate with the shaft; but the opening 136 is of such dimensions as to permit free longitudinal movement of the disk 135 on the shaft 81. The disk 135 is positioned intermediate the faces 133 and 134 respectively, of the disks 131 and 132. Each of the forward and rearward surfaces 138 and 139 of the disk 135 is provided with a series of equally spaced radial teeth. The teeth on the forward surface 138 of the disk 135 correspond in number and dimensions to the teeth on the face 134 of the disk 132, and the teeth on the rearward surface 139 of the disk 135 correspond likewise to the teeth on the face 133 of the disk 131. Forward movement of the disk 135 on the shaft 81 causes the teeth on the surface 138 of said disk to engage the teeth on the disk 132 for rotating the clutch casing 115 in one direction, and rearward movement of the disk 135 engages the teeth on the surface 139 of the disk 135 with those on the disk 131 to rotate the clutch casing in the opposite direction.

It will be noted in Figure 7 that the depth of the teeth on the clutch disks is small with relation to the pitch thereof, and that engagement or disengagement of the intermediate disk 135 with either of the end disks 131 and 132 may be had with slight longitudinal movement. The leading edges 140 of the clutch teeth are disposed in planes passing through the axis of shaft 81 whereby the teeth are not wedged in one another when they are in engagement.

Shifting of the intermediate disk is provided for in the following manner. A pin 141, rigid with the intermediate disk 135, extends through elongated slots 142 in the shaft 81 and a slot 143 in a shifting rod 144. When the shaft 81 is rotated, the sides of the slot 142 contact with the pin 141 causing the pin to rotate with the shaft, and the pin 141 engages the sides of the slot 143 in the shifting rod to rotate the shifting rod with the shaft. The rod 144 is mounted in the shaft 81 and is supported at its rear end in a bushing 145 pressed in the boss 125 on the clutch rear end plate and at its forward end by means of a collar 146, fixed on the rod, riding in a recess 147 in the shaft 81.

The pin 141 extends through a collar 163 mounted on the rod 144 to rotate therewith. The collar 163 is arranged to slide freely longitudinally of the rod 144. A spring 164 is interposed between a shoulder 165 on the collar 163 and a shoulder 172 in the enlarged bore 124 and tends to hold the teeth on the surface 139 of the disk 135, by means of collar 163 and the pin 141, in engagement with the teeth on the disk 131. A spring 171, interposed between a shoulder 173 on the shifting rod 144 and the bottom of the enlarged bore 124 tends to maintain the rod in its most rearward position, and hold the teeth on the surface 138 of the intermediate disk out of engagement with the teeth on the disk 132. The shifting rod 144 is moved longitudinally of the shaft 81 by manually rocking a lever 150 pivoted to the cover 113 at 151. A bar can be inserted in a recess 152 in the upper end of the lever 150 to decrease the manual effort required to disengage the clutch elements. The lower end of the lever 150 is pivoted at 153 to a lug 154 on one end of an L-shaped bar 155. The other end of the L-shaped bar moves the rod 144 when the lever 150 is rocked by contacting with a circumferential shoulder 156 on the collar 146 and a washer 157 fixed by a lock nut 158 to the shifting rod.

A latch 159 hinged to the cover 113 is held in contact with notch 160 or notch 161 in the quadrant 162 on the L-shaped bar 155 by a spring 169 to maintain the clutch shifting mechanism in such positions that the fuel conveyor in the stoker conduit will be held, respectively in inoperative position or fuel forwarding position. The spring 169 is of sufficient tension to normally hold the latch 159 engaged in notches 160 and 161 whereby the clutch shifting mechanism is held in either of two locked positions, which are, a position so that the clutch disk 135 is not in engagement with either of the disks 131 and 132 and a position whereby the disk 135 engages the disk 131 to cause the conveyor to move fuel forward in the stoker conduit.

A flange 167 on the cover 113 prevents dust and water from getting into the driving mechanism through the end 148 of the hub 121 and the boss 149. The driving and clutch mechanism is lubricated by means of pipe lines (not shown) leading from the ducts 168 to an oil reservoir.

Assuming the stoker motor to be operating and the intermediate clutch disk in neutral position or the position shown in Fig. 4, and it is desirable to advance fuel through the stoker conduit, the upper end of the lever 150 is rocked forward moving the L-shaped bar 155 rearward causing the latch 159 to disengage the notch 160 and engage the notch 161. The shifting rod is also moved rearward permitting the collar 163, the pin 141 and the intermediate disk 135 to be forced rearward by the tension of spring 164, causing the teeth on the rear surface of the intermediate disk to engage the teeth on the disk 131. During oscillation of the disk 135 the leading faces of the teeth thereon engage the leading faces of the teeth on the disk 131 during rotation of the disk 135 in one direction, causing the clutch casing and the fuel conveyor to rotate therewith; and when the disk 135 rotates in the opposite direction, the rear edges 170 (Fig. 7) of the teeth on the disk 135 slip over the rear edges of the teeth on the disk 131 causing the clutch casing to stand still until the leading edges of the teeth are again engaged by rotation of the disk 135 in the first mentioned direction. As the teeth on one disk slip over the teeth on the other disk the intermediate disk, the pin 141, the collar 163 and the spring 164 vibrate longitudinally a distance corresponding to the depth of the teeth.

To reverse the rotation of the fuel conveyor in the stoker, the upper end of the lever 150 is rocked to its extreme rearward position. Such movement of the lever 150 causes forward movement of the shifting rod 144 by means of the L-shaped bar 155 and the rear edge 166 of the slot 143 in the shifting rod contacts with the pin 141 pulling said pin and the intermediate disk forward to engage the teeth on the forward surface 138 of said disk with the teeth on the disk 132. The lever 150 must be held manually in this position until it is desirable to render the fuel conveyor inoperative or place the clutch mechanism in the fuel forwarding position.

I claim:

1. In combination, a drive shaft, means for imparting oscillatory movement to said drive shaft, a clutch including a casing freely carried by said drive shaft, two spaced clutch members rigid with the casing, a third clutch member mounted on said drive shaft and arranged to oscillate therewith, and means for sliding said third clutch member longitudinally along said shaft, independently of the direction of rotation of said oscillating drive shaft, in one direction to engage one of said spaced clutch members for rotating said casing in one direction and in the opposite direction to engage the other of said spaced clutch members for rotating said casing in the opposite direction.

2. In combination, a drive shaft, means for imparting oscillatory movement to said drive shaft, a casing freely carried by said drive shaft, a pair of driven members rigid with the casing, a drive member mounted on said drive shaft to oscillate therewith and means for sliding said drive members longitudinally along said shaft in either direction independently of the direction of rotation of said oscillating drive shaft to selectively engage either of said driven members to cause rotation of said casing.

3. In combination, a drive shaft and means for oscillating said shaft, a driven shaft, a clutch interposed between said shafts comprising a casing carried by the drive shaft and mounted thereon for rotation in opposite directions, a pair of spaced clutch members rigid with the casing, a third clutch member carried by said drive shaft, means for sliding said third clutch member longitudinally along said drive shaft in either direction independently of the direction of rotation of said oscillating drive shaft to selectively engage either of said spaced clutch members to cause rotation of the driven shaft in opposite directions and means arranged to retain said third clutch member in position for engagement with one of said spaced clutch members and out of engagement with the other of said members.

4. In combination, a drive shaft and means for continuously oscillating said shaft, a driven shaft, and a clutch interposed between said shafts comprising a casing mounted on the drive shaft for rotation in opposite directions, means arranged to secure said casing on said drive shaft with respect to relative longitudinal movement, a plurality of spaced clutch members rigid with the casing, a member carried by the drive shaft and arranged to oscillate therewith and means for sliding said last named member longitudinally along said drive shaft in either direction independently of the direction of rotation of said oscillating drive shaft to selectively engage either of said spaced clutch members to cause rotation of the driven shaft in opposite directions.

5. In combination, a drive shaft having a longitudinal bore therethrough and a plurality of elongated slots therein, a driven shaft, a clutch interposed between said shafts having a casing rotatably mounted on the drive shaft, means for continuously oscillating said drive shaft, a plurality of spaced clutch members rigid with the casing, a clutch member on the drive shaft arranged to oscillate therewith, a rod extending throughout the bore in the drive shaft and having an opening therethrough, a pin on the last named clutch member extending through the slots in the drive shaft and the opening in said rod and means for shifting said rod longitudinally thereby engaging the last named clutch member with either of the first mentioned members independently of the direction of rotation of said oscillating drive shaft to cause rotation of said casing.

6. In combination, a drive shaft, means for continuously oscillating said drive shaft, a driven shaft, a clutch interposed between said shafts having a casing, a plurality of spaced clutch members rigid with the casing, and a clutch member intermediate said members arranged to rotate with the drive shaft and to slide longitudinally thereon in either direction independently of the direction of rotation of said oscillating drive shaft, a rod mounted within the drive shaft, means operatively connecting one end of the rod with the last named clutch member, and a lever operatively connected to the other end of said rod for shifting the same, thereby engaging the last named clutch member with either of the first mentioned members to cause rotation of the casing in opposite directions.

7. In combination, a drive shaft, means for continuously oscillating said drive shaft, a driven shaft, a clutch interposed between said shafts having a casing, a plurality of spaced clutch members rigid with the casing, and a clutch member intermediate said members arranged to oscillate with the drive shaft, and means for shifting said last named member longitudinally of the drive shaft independently of the direction of rotation of said oscillating drive shaft for selectively engaging the last named member with either of the first named members to cause rotation of the casing in opposite directions, said means comprising a rod operatively connected at one end to the intermediate clutch member, and a pivoted lever operatively connected to the other end of said rod, and means for maintaining the shifting means in one of a number of locked positions.

8. In combination, a drive shaft, means for continuously oscillating said drive shaft, a driven shaft, a clutch interposed between said shafts having a casing, a plurality of spaced clutch members rigid with the casing, and a clutch member intermediate said members arranged to oscillate with the drive shaft, means arranged to maintain the last named member in engagement with one of the first named members, and means for shifting the intermediate clutch member longitudinally of the drive shaft independently of the direction of rotation of said oscillating drive shaft for selectively engaging the intermediate clutch member with either of the first named members to cause rotation of the casing in opposite directions comprising a rod operatively connected to said intermediate member, and a lever operatively connected to said rod, and means for maintaining the shifting means in locked position.

9. In combination, a driving member, means for imparting oscillatory movement to said driving member, a driven member, a pair of spaced plates carried by said driven member and each provided with clutch members, a clutch member on said driving member arranged to oscillate therewith and means for sliding said third clutch member longitudinally along said driving member to engage the clutch members on either of said spaced plates independently of the direction of rotation of said driving member for operating said driven member.

GRANT REID.